(12) United States Patent
Leach et al.

(10) Patent No.: US 6,409,287 B1
(45) Date of Patent: Jun. 25, 2002

(54) YAW CONTROLLING APPARATUS FOR AN AUTOMOBILE

(75) Inventors: Martin Leach, Wachtberg (DE); Shouichi Kamimura, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 09/643,961

(22) Filed: Aug. 23, 2000

(30) Foreign Application Priority Data

Aug. 24, 1999 (JP) ............................................ 11-236433

(51) Int. Cl.$^7$ .................................................. B60T 8/60
(52) U.S. Cl. ........................................ 303/146; 180/410
(58) Field of Search ................................ 303/146, 140, 303/148, 149, 150; 180/197, 6.2, 6.28, 244, 282, 400, 410, 411, 415, 421, 422, 445, 446

(56) References Cited

U.S. PATENT DOCUMENTS 4,969,541 A * 11/1990 Lin ............................. 188/156

FOREIGN PATENT DOCUMENTS

| | | | |
|---|---|---|---|
| DE | 19549082 A1 | * | 7/1997 |
| JP | 63074759 A | * | 4/1988 |
| JP | 9-58426 A | * | 3/1997 |
| JP | 10-100740 | | 4/1998 |
| JP | 10-315943 | | 12/1998 |
| JP | 2000-62584 A | * | 2/2000 |
| JP | 2001-80479 A | * | 3/2001 |

* cited by examiner

Primary Examiner—Pam Rodriguez
(74) Attorney, Agent, or Firm—Nixon & Peabody LLP; Donald R. Studebaker

(57) ABSTRACT

A yaw controller for a vehicle allows easy manipulation of controls for actively developing brake force in an particular right or left wheel to achieve the turning performance and cornering desired by the driver. A pair of lever style yaw moment booster switches [Y2 and Y1) extending out from the steering column is provided at the front (driver side) of the steering wheel (S3) along the right and left spokes (3b and 3a) from the center pad (1). The yaw moment booster switches (Y2 and Y1) can then be easily operated by the driver while holding the steering wheel (ST3) with both hands by simply extending a thumb to press the desired switch. More particularly, the switches are placed at approximately the ten o'clock and two o'clock positions of the steering wheel (ST3) slightly above the left and right spokes (3a and 3b).

10 Claims, 13 Drawing Sheets

YAW CONTROLLING APPARATUS FOR AN AUTOMOBILE

BACKGROUND OF THE INVENTION

1. Field of the Invention

The present invention relates to a yaw controller for actively changing vehicle yaw by operationally controlling the brake force independently developed in the right and left side wheels of the vehicle.

2. Description of Related Art

Numerous yaw controlling devices have been proposed for improving vehicle safety by automatically controlling the brake force applied to each wheel as a means of stabilizing vehicle behavior when the vehicle takes a turn. Japanese Patent Laid-Open Publication HEI 10-315943, for example, teaches a device for imparting a sufficient yawing moment to the inside of the direction of vehicle rotation by applying brake force to the rear inside wheel of vehicle yaw when vehicle drift out is detected.

Devices that automatically apply the brakes to a particular wheel to change vehicle behavior in a stabilizing direction when unstable vehicle behavior is detected when the vehicle turns are thus known.

Vehicles in which the brakes can be intentionally applied independently to right and left wheels, typically by the operator, are also known. Typical of such vehicles is the specialty vehicle such as a tractor.

A common use for actively applying the brakes independently to the right and left wheels on a tractor is to reduce the turning radius of the tractor at low speed. As taught in Japanese Patent Laid-Open Publication HEI 10-100740, separate brakes pedals are provided for the right and left wheel brakes. By separately operating these brake pedals, the operator can independently apply the brakes to the right and left wheels.

It is also desirable when driving a car, particularly when driving in car races on a race track or road rally, for the driver to be able to intentionally impart a desirable yawing moment to the vehicle in order to improve turning performance, and particularly to improve cornering performance.

Producing sufficient cornering force in each wheel is necessary in order to produce a desired yawing moment, but amount of produced cornering force varies greatly with the driving conditions of the vehicle.

For example, when the steering wheel is turned a large steering angle while driving at high speed, the cornering force of the front wheels becomes saturated and understeering occurs. The vehicle thus drifts out. Furthermore, when the front wheels slip on a road surface with a low coefficient of friction ($\mu$), substantially no cornering force is produced, understeering results, drift out occurs again, and the desired yawing moment cannot be produced.

By automatically applying brake force to the rear inside wheel of the yaw when drift out is detected, the yaw control device taught in Japanese Patent Laid-Open Publication HEI 10-315943 can limit drift out from continuing when it occurs.

This yaw control device only works to change vehicle behavior in a stabilizing direction, however, and therefore cannot be used by the driver to achieve a desired turning performance in order to limit drift out before it is detected or to improve cornering performance with a slight oversteer.

It should be noted that the tractor braking system that allows the operator to independently apply the brake force to the right and left wheels is designed for making small radius turns at low speed. It is not designed to apply specific brake force to the wheels in order to achieve a desired yaw moment. A driver therefore cannot use this braking system to achieve a desired turning performance.

Even if such a system could be used to actively selectively apply brake force to the right and left wheels at medium or high speeds, the brake pedals must be separately operated with a tractor-like brake system. Combined with the need to operate other pedals (such as the accelerator and clutch) is considered, operation becomes extremely complex. Furthermore, it is extremely difficult to independently operate right and left brake pedals with the degree of fine control required to achieve a particular yaw moment, and it is, therefore, not practically possible to achieved a desired yaw moment.

SUMMARY OF THE INVENTION

The present invention was conceived with the above described problems in mind, and the intent of the invention is to provide a vehicle yaw controlling apparatus that enables a driver to achieve a desired turning performance, and particularly a desired cornering performance, by actively applying brake force independently to the right and left wheels through a simple operation.

To achieve the above object, a yaw controlling apparatus according to the present invention is a vehicle brake system capable of independently controlling right and left wheels, and has a pair of right and left operating switches disposed so that the driver can easily and independently operate the right and left operating switches while holding the steering wheel with both hands; and a control device for applying brake force to the brake unit of one of the right and left wheels when the driver operates one of the operating switches, and applies brake force to the brake unit of the other of the right and left wheels when the driver operates the other operating switch.

The brake switches can be therefore be operated separately from the foot-operated brake pedal at a position easily accessible to the hands. The operation used to independently apply brake force to the right and left wheels is thus uncomplicated and differential brake force can be easily controlled by the driver. Operability and safety can thus both be improved.

In this vehicle yaw controlling apparatus, the left operating switch preferably controls a left wheel brake unit, and the right operating switch controls a right wheel brake unit. The braking effect intended by the driver can thus be easily achieved while operability is improved and intuitive.

Further preferably, the brake force developed in a brake unit changes according to the applied pressure or stroke of the operating switch that was operated. Brake force accurately reflecting the brake force desired by the driver can therefore be developed in the particular brake unit. Operation can thus be desirably optimized, and handling stability improved.

Yet further preferably, the vehicle yaw controlling apparatus additionally has a control prohibiting means for prohibiting operation by the control device under one or more specific conditions. Driving safety and steering stability can thus be assured because operation of the yaw controller can be prohibited when, for example, the braking effect requested by the driver is inappropriate to vehicle behavior.

In one particular aspect of the invention, this control prohibiting means is a driver identification means for permitting use of the yaw controlling apparatus only by a particular driver. Driving safety and steering stability can thus be assured because unknown drivers with potentially low level driving skills, for example, are not allowed to use the yaw controlling apparatus.

Yet further preferably in this case the control device has a manual mode for developing brake force in a brake unit as directed by the driver, and an automatic mode for automatically correcting the brake force indicated by the driver operation of the operating switch according to specific conditions and then developing the corrected brake force in the brake unit. It is therefore possible to assure that the control is mode appropriate to how the vehicle is to be driven. As a result, both of a control state in accordance with a driving scenario of the vehicle and a control state in accordance with the driver's intention can be obtained.

Yet further preferably in this case the vehicle yaw controlling apparatus has a mode selecting unit enabling the driver to s elect either the manual mode or the automatic mode. In this case the driver can select the appropriate control mode appropriate to how the vehicle is to be driven. As a result, both of a control state in accordance with a driving scenario of the vehicle and a control state in accordance with the driver's intention can be obtained.

Yet further preferably, the brake force developed in a brake unit is determined so that the sensitivity of the operating switch is greater when initially operated and gradually declines as switch operation continues. By thus limiting the change in brake force in the high brake force range to gradual change, the wheel brakes can be prevented from locking up and steerability can be assured.

Yet further preferably, the brake force developed in a brake unit is determined so that the increase in brake force in response to operating switch operation decreases as vehicle speed increases. The change in brake force at high vehicle speeds can thus be kept small, improving steerability and safety at high speed.

In a preferred aspect of the invention, the control prohibiting means of the vehicle yaw controlling apparatus prohibits yaw moment control when the vehicle yawing direction is detected to be opposite the steering direction. Yaw moment control is thus prohibited when a counter steering condition is detected.

If the operating switch on the same side as the direction in which the steering wheel is turned is operated as usual during a counter steering condition, that is, when the steering wheel is turned opposite the yawing direction of the vehicle, the effectiveness of counter steering will be diminished and the tendency of the vehicle to spin enhanced. By disabling yawing moment control when counter steering is detected, loss of steering stability resulting from misoperation can be reliably prevented.

Further preferably, the control prohibiting means prohibits yaw moment control when the steering angle exceeds a specific large angle, and thus prohibits yaw moment control when the steering wheel is turned greatly. Steering stability is thus assured when the steering wheel is turned to an angle effecting a quick change in vehicle direction, and vehicle instability resulting from the steering angle exceeding the tire limits can be prevented.

Yet further preferably, the control prohibiting means prohibits yaw moment control when engine output exceeds a specific high output level. Yawing moment control is thus prevented and steering stability is assured when transfer of high engine output to tires on one side could easily make vehicle behavior unstable.

Yet further preferably, the control prohibiting means prohibits yaw moment control when braking as a result of the driver operating the brake pedal is detected. In this case yawing moment control is prevented from interfering with normal brake operation, and thus assures reliable braking as expected by the driver.

With a vehicle yaw controlling apparatus according to a further aspect of the invention, brake force is developed only in the brake unit of the rear wheel on the side corresponding to the operating switch. In this case yawing moment control is prevented from interfering with vehicle behavior resulting from front wheel steering, and steerability is thus improved.

Yet further preferably, the vehicle yaw controlling apparatus also has a yaw rate brake force regulating means for regulating the brake force developed in a brake unit so that the actual yaw rate developed in the vehicle by the control device does not exceed an appropriate yaw rate range. Safety is thus improved by automatically suppressing excessive yawing moment adjustment by the driver.

Yet further preferably, the vehicle yaw controlling apparatus has a slipping brake force regulating means for regulating the brake force developed in a brake unit so that the wheel slip rate is controlled to less than or equal to a specific slip rate. Safety is assured in this case by controlling the developed brake force within an acceptable wheel slip range.

When the vehicle is equipped with a slip control device (for example, an antilock brake system) for suppressing wheel slipping, or a dynamic stability control system for stabilizing vehicle behavior when cornering, the yaw controlling apparatus further preferably has a means for prioritizing control intervention when control by the slip control device or dynamic stability control system starts to operate. Safety can be improved in this case because a change in vehicle behavior from misoperation or excessive operation by the driver is reliably prevented.

The operating switches of our vehicle yaw controlling apparatus can be either push devices disposed on the front of the steering wheel, or pull devices disposed on the back of the steering wheel.

When the operating switches are push devices on the front of the steering wheel, they can be easily operated while glancing at the switches without taking either hand off the steering wheel, and can be operated with an extremely simple pushing operation. Switch operability is thus excellent.

Furthermore, when the operating switches are pull devices on the back of the steering wheel, the hands will not interfere with the operating switches when using the steering wheel because the switches are not on the front of the steering wheel, and unintentional operation of the switches can be reliably prevented.

Yet further preferably, the vehicle yaw controlling apparatus evaluates vehicle behavior to automatically correct the ratio of brake force distributed to the front and rear wheels on the side corresponding to the operated operating switch. The distribution of brake force to the front and rear wheels on the side of the operated switch is thus optimally controlled to achieve optimum vehicle behavior.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The preferred embodiments of the present invention are described below with reference to the accompanying figures.

(1) Control System Configuration

Figure 1:
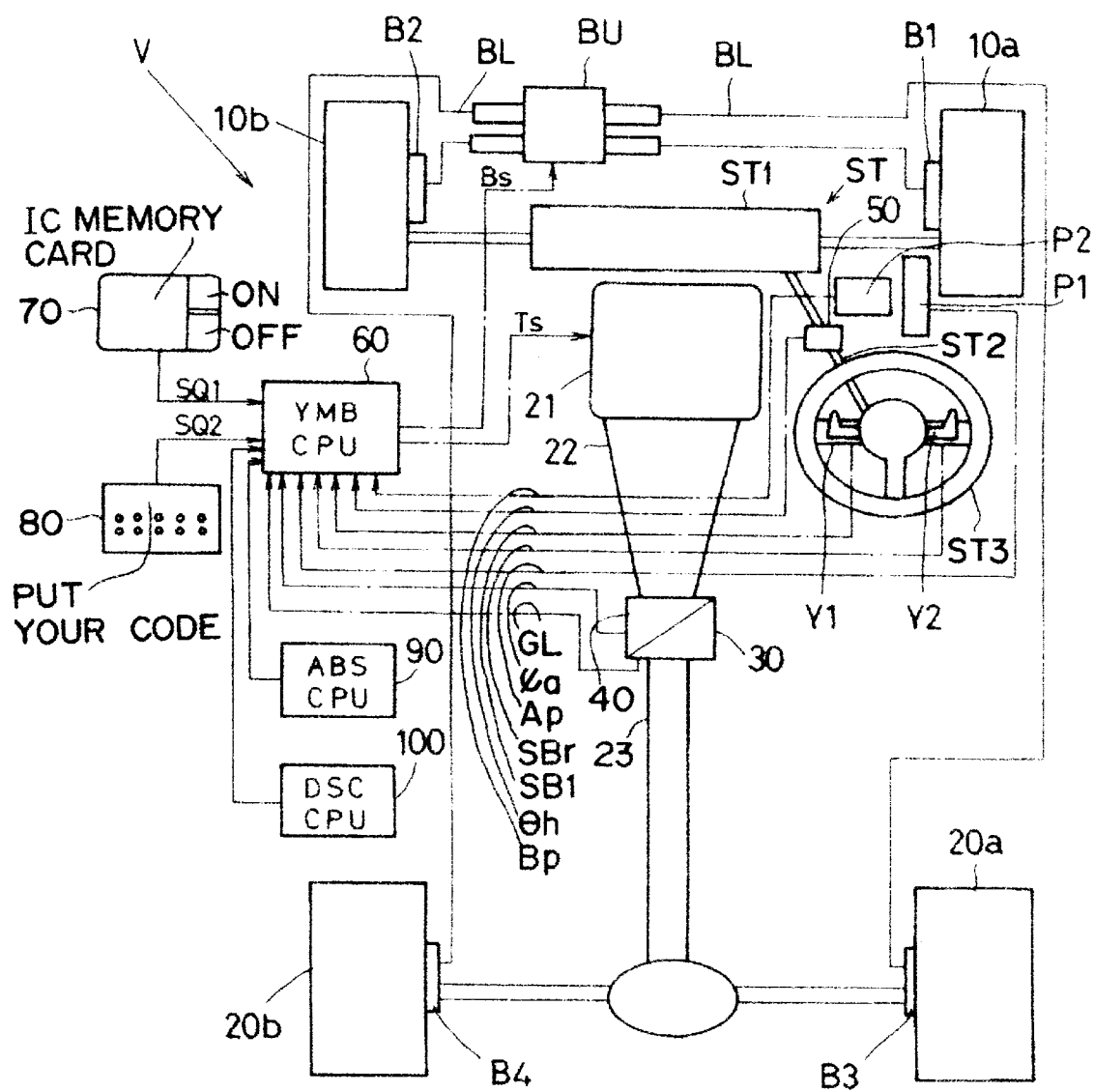
FIG. 1 is a schematic diagram of a yaw controlling system in which the present invention is used.

FIG. 1 is a schematic diagram of a yaw controlling system according to the present invention.

The vehicle V in which this yaw controller is deployed as, what is called a FR type (front engine, rear wheel driver type) vehicle in which the front wheels 10a and 10b are the wheels which are to be steered by the steering unit ST (Hereinafter, they are referred to as steered wheels), and the rear wheels 20a and 20b are the drive wheels driven by a drive train including engine 21, transmission 22, and drive shaft 23.

A brake unit B1, B2, B3, and B4 including, for example, brake discs and calipers (not shown in the figure) is disposed to each of the left and right front wheels 10a and 10b and left and right rear wheels 20a and 20b.

Each of the brake units B1, B2, B3, and B4 is connected to the brake fluid unit BU by intervening brake line BL. Brake pressure is developed from the brake fluid piping unit BU to apply the brakes to each wheel.

The steering unit ST includes an electrical power steering mechanism ST1, steering shaft ST2, and steering wheel ST3. When the driver turns the steering wheel force is applied by the steering unit ST to the front wheels to effect a corresponding response.

A pair of right and left yaw moment booster switches Y2 and Y1 is provided on the steering wheel ST3. These yaw moment booster switches Y2 and Y1 are used to independently apply the brake forces to the right and left rear wheels to impart a desired yaw moment to the vehicle.

An accelerator pedal P1 and brake pedal P2 operated by the driver's feet are provided below the steering wheel ST3. The driver operates these pedals to control engine output and to apply the brakes to the wheels.

A lateral acceleration sensor 30 for detecting transverse gravitational accelerations on the vehicle, and a yaw rate sensor 40 that detects the actual yaw rate of a turning vehicle, are provided in the center of the vehicle. A steering angel detector 50 for sensing the steering angle is provided on the steering shaft ST2.

These various sensors, detectors, devices apply various detecting signals to the central processing unit of the yaw moment booster (YMBCPU) 60. These applied signals include throttle opening signal Ap detected from accelerator pedal P1; brake pedal signal Bp from brake pedal P2; steering angle signal θh from the steering angle detector 50; lateral acceleration signal G1 from lateral acceleration sensor 30; actual yaw rate signal $\psi$a from yaw rate sensor 40; and the right and left brake switch signals SBr and SBl from the right and left yaw moment booster switches Y2 and Y1. Security signals SQ1 and SQ2 from IC card 70 and multi-display 80 are also applied to YMBCPU 60.

Various data signals used for vehicle control to assure safe vehicle behavior are also applied from an antilock brake system (ABS) unit 90 for controlling wheel slipping, and a dynamic stability control (DSC) unit 100 for stabilizing vehicle behavior while driving. These data signals include vehicle speed, the wheel speed of each wheel, and the control status of various devices.

The central processing unit of the yaw moment booster (YMBCPU) 60 outputs a brake pressure signal Bs to the brake fluid unit BU for controlling the brake pressure of each wheel, and a throttle control signal Ts to the electronic throttle (not shown in the figure) of the engine 21.

Figure 2:
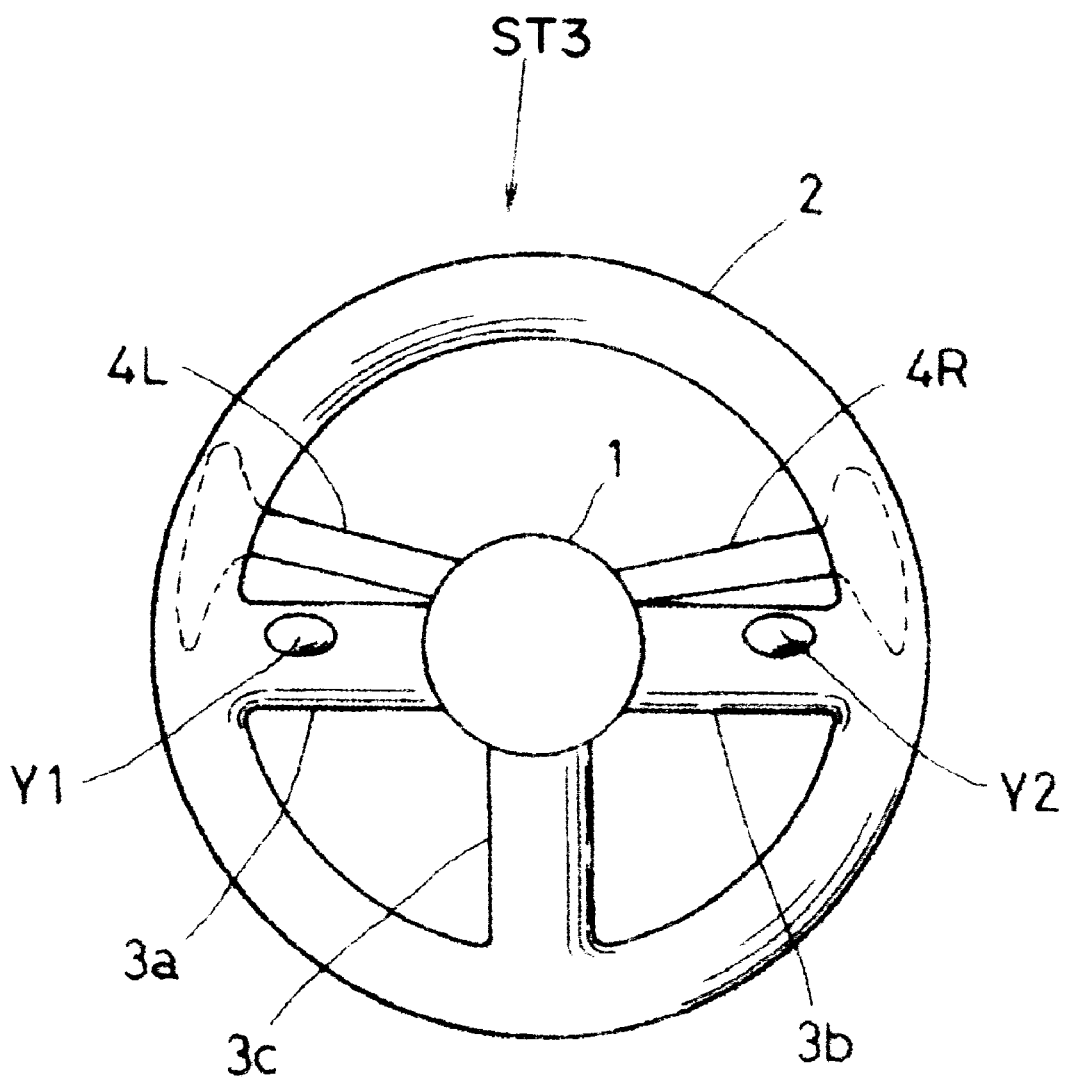
FIG. 2 is a front view of a steering wheel.
Figure 3:
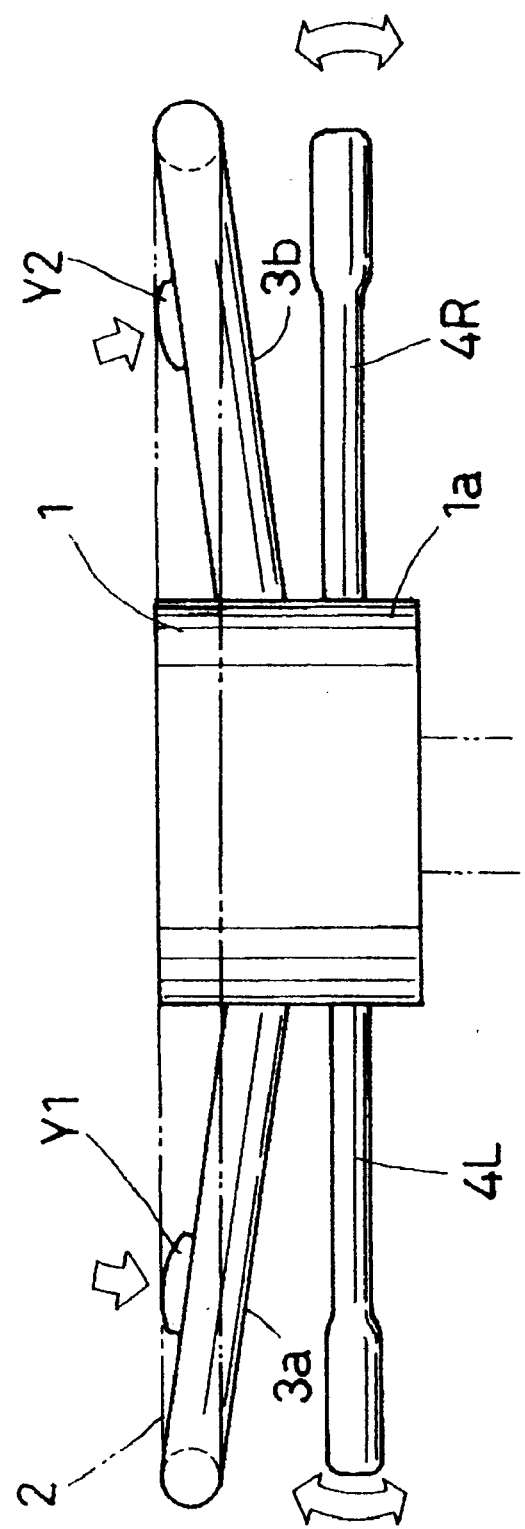
FIG. 3 is a side view of a steering wheel.

FIG. 2 and 3 are front and side views, respectively, of the steering wheel ST3 on which the yaw moment booster switches Y2 and Y1 are disposed.

The steering wheel ST3 typically has a center pad 1 in which an airbag (not shown in the figure), for example, is stored, a wheel part 2 that is gripped by the driver; and a plurality of spokes 3a, 3b, 3c between the wheel part 2 and center pad 1.

In the typical example shown in FIG. 2 with three spokes 3a, 3b and 3c, the yaw moment booster switches Y2 and Y1 are provided on the front (the side facing the driver) of the two horizontal spokes 3a and 3b. These are typically push-button type switches.

Furthermore, the yaw moment booster switches Y2 and Y1 are positioned so that the driver can easily operate the switches by simply extending the thumbs and applying pressure to the switches when the steering wheel ST3 is gripped in a normal driving position. More specifically, the yaw moment booster switches Y2 and Y1 are placed slightly above the center of the spokes 3a and 3b within easy reach of approximately the standard ten o'clock and two o'clock gripping positions of the steering wheel ST3.

Thus positioning the yaw moment booster switches Y2 and Y3 means that independently operating the right and left switches to apply brake pressure separately to the right or left wheels does not become complicated and more specifically can be easily accomplished. As a result, operability and safety can both be improved.

Furthermore, by making it possible for the operator to activate the yaw moment booster switches-Y2 and Y1 while continuing to hold the steering wheel ST3 with both hands, changes in the steering angle when the driver operates one of the switches Y2, Y1 when turning or cornering can be eliminated. Yet further, because the driver is still holding the steering wheel ST3 with both hands, the driver can quickly compensate by turning the steering wheel if vehicle behavior is destabilized as a result of differentially applying brake pressure with the switches Y2, Y1.

It is also possible to easily make fine adjustments in brake pressure because the yaw moment booster switches Y2 and Y1 are operated with the thumbs. Yet further, placing the switches on the front of the steering wheel ST3 means the switches Y2, Y1 can be easily operated without even looking at them. Operation is therefore very safe.

Seesaw type shift levers 4R and 4L are also provided on the back (windshield side) of the steering wheel ST3 extending along the right and left spokes 3b and 3a to the outside from the center steering boss 1a.

These gear shift levers 4R and 4L are further positioned so that they can be operated using the index or middle fingers while holding the steering wheel ST3 with both hands. More specifically, these levers 4R and 4L are also positioned at approximately the ten o'clock and two o'clock positions of the steering wheel ST3.

Thus placing the shift levers 4R and 4L makes it possible to perform shift operations while holding the steering wheel ST3 with both hands, and more particularly makes it easy to shift gears while turning.

It should be noted that in this exemplary embodiment the shift levers 4R and 4L are configured so that pulling the left lever 4L forward (towards the driver) shifts up, and pulling the right lever 4R forward shifts down.

Figure 4:
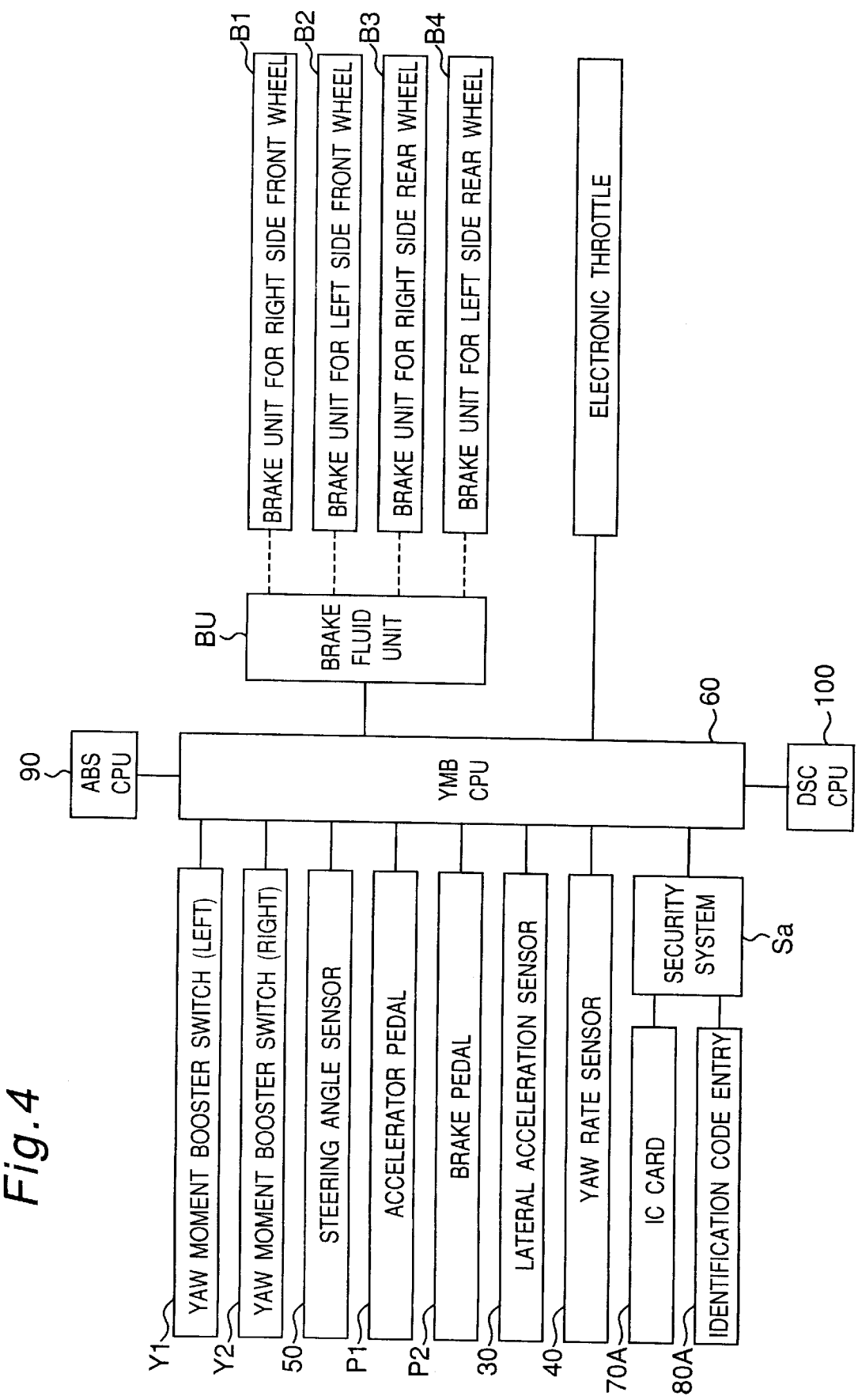
FIG. 4 is a block diagram of a yaw controlling system according to the present invention.

FIG. 4 is a block diagram of an exemplary yaw control system.

As shown in this figure, the right and left yaw moment booster switches Y2 and Y1 steering angle detector 50, accelerator pedal (sensor) P1, brake pedal (sensor) P2, lateral acceleration sensor 30, yaw rate sensor 40, and security system SQ are connected to the input side of the central processing unit of the yaw controlling apparatus (YMBCPU) 60, and the brake fluid unit BU and electronic throttle ET are connected to the output side.

Further connected to the security system SQ are scanner 70A for reading magnetic data from an IC card, and code entry unit 80A for entering an identification code.

It should be further noted that the right front brake unit B1, left front brake unit B2, right rear brake unit B3, and left rear brake unit B4 are connected by intervening brake piping lines to the brake fluid unit BU.

(2) Control Flow of the Control System

Figure 5:
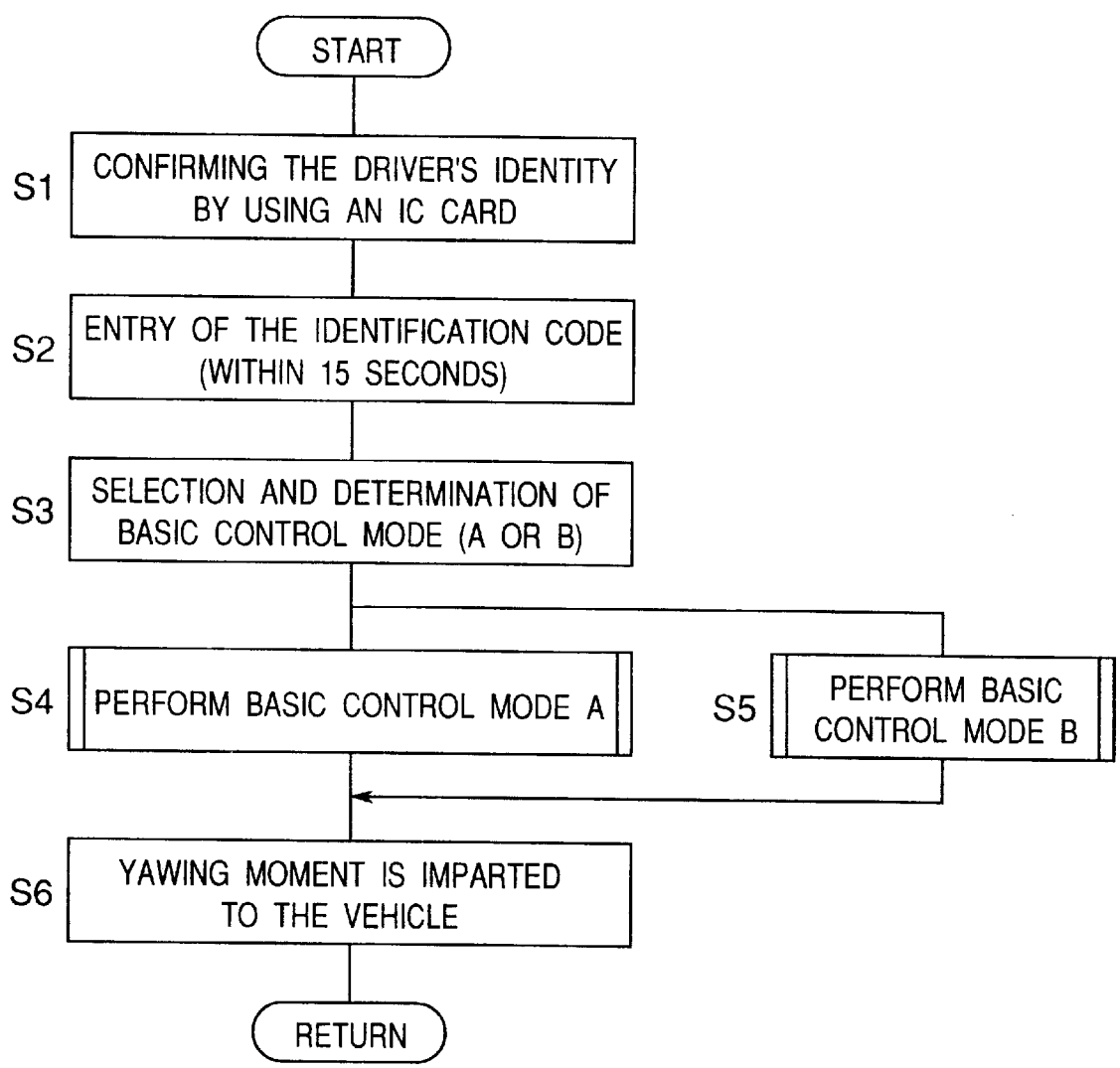
FIG. 5 is a flow chart of the main control loop in a yaw controller according to the present invention.

The control flow of a yaw controller as described above will be explained next below with reference to the flow charts in FIG. 5 to FIG. 8. FIG. 5 is a flow chart of the main control loop, and is described first below.

The first step (S1) is to assure the safety and security of the vehicle by confirming the driver's identity. This is accomplished more specifically by using an IC card 70 storing specific driver information. The IC card 70 is issued only to a particular driver that has passed an appropriate driving skills test administered, for example, by the vehicle manufacturer. This prevents the yaw controller from being operated by a third party that has not reached a particular skill level or by a driver with a different IC card.

Next (S2), using a touch panel, for example, on display 80, the driver must enter an identification code issued only to the IC card 70 holder. This code must be entered within fifteen seconds after the ignition starts. By thus using a redundant security check, unauthorized third parties can be more reliably prevented from using the yaw controller because the yaw controller cannot be activated using only the IC card 70. As a result, someone that has not reached a particular skill level cannot use the yaw controller when driving, and safety can thus be reliably assured.

After thus confirming in steps S1 and S2 that the driver is authorized to use the yaw control system, the security system passes control to step S3 for yaw control.

In step S3 the driver selects either basic control mode A or B for yaw control. Basic control mode A, manual control, is for use on a race track or other type of competitive driving. Basic control mode B (automatic yaw correction control) is for driving on public roads where safety is of primary importance.

This selection can be made in various ways, including allowing the driver to freely select the desired mode using a touch panel on display 80, or by having the controller automatically select the yaw control mode based on road data obtained from the navigation system to assure the highest level of safety.

Depending on the selection made in S3, basic control mode A or B is performed in step S4 or S5.

The calculated brake force obtained from mode A or mode B is then developed in the rear wheel brake unit B3 or B4 for the wheel to which yaw control is to be applied. The desired yawing moment can thus be imparted to the vehicle, and the vehicle driving performance can be improved.

It should be noted that interference with steering the front wheels can be avoided by using the right and left rear wheels for yaw control, and steering performance can therefore also be improved.

Basic control mode A (manual control) is described next below with reference to the flow chart in FIG. 6.

First, at step SA1, vehicle data is read when the appropriate input signal is applied to the central processing unit of the yaw moment booster (YMBCPU) 60 shown in FIG. 4.

The operation (stroke length or pressure) and state (which switch was operated and how quickly) of the yaw moment booster switch Y2, Y1 operated by the driver is then read (SA2).

Using the yaw moment booster switch operation data detected in SA2, the brake force to be applied based on yaw moment booster switch operation (referred to below as the switch brake force) is determined by referencing the brake force characteristic curve shown in SA3.

Figure 6:
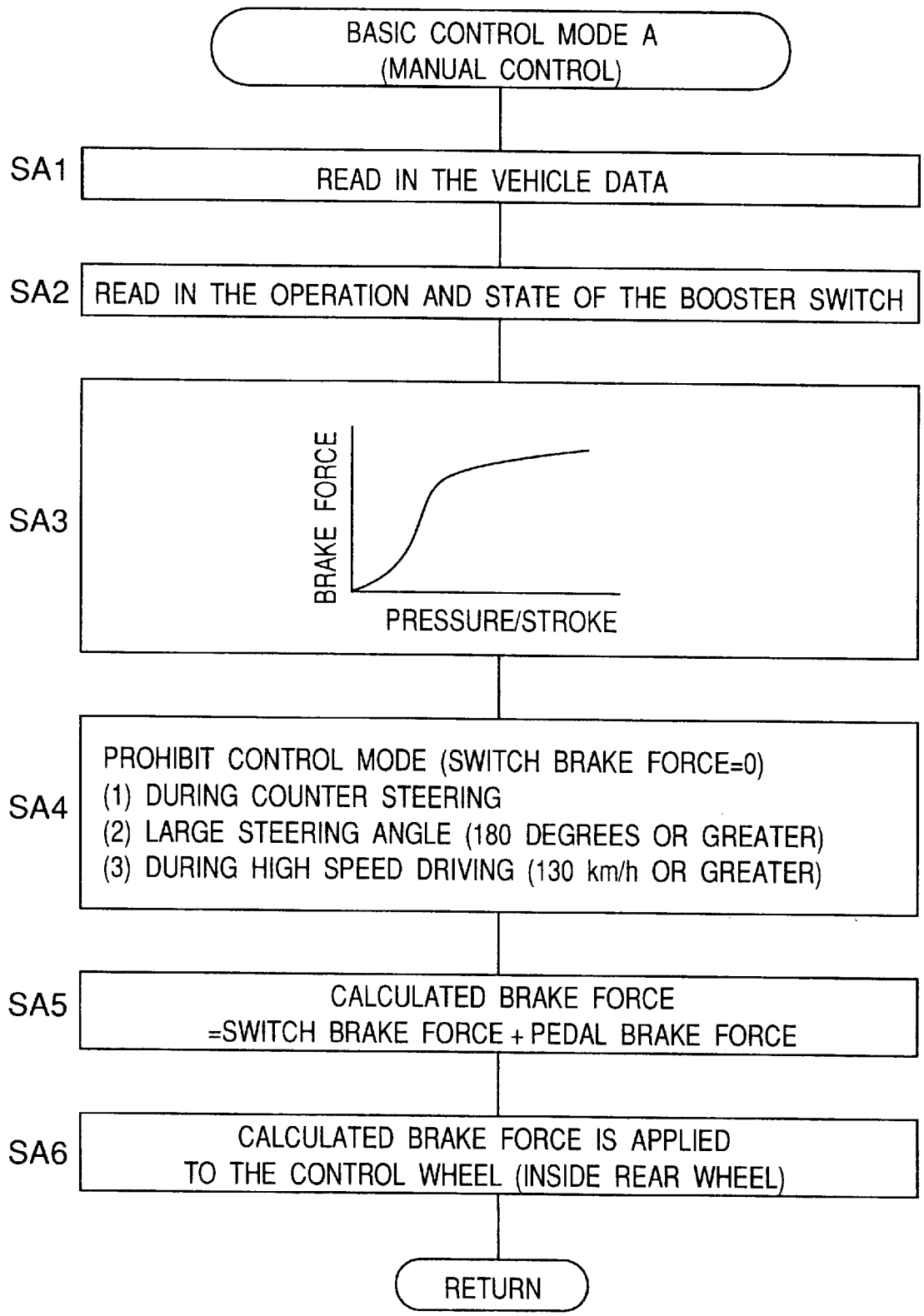
FIG. 6 is a flow chart of basic control mode A for manual control in the main flow chart shown in FIG. 5.

As shown in SA3 in FIG. 6, this brake force and switch pressure/stroke curve rises sharply when the switch pressure/stroke is low, and continues to rise gradually when the pressure/stroke is high. By thus setting the brake force characteristic, brake sensitivity is high at the beginning of yaw moment booster switch operation so that the desired brake force can be quickly developed, and brake sensitivity drops off as the switch continues to be applied so that brake force changes more gradually.

It is therefore possible to immediately develop a desired yawing moment in the vehicle by increasing brake force and effectiveness when the driver wants to develop a particular yaw moment and first operates the yaw moment booster switch. Safety is also assured when vehicle behavior tends to destabilize as the switch continues to be operated by preventing differential application of the brakes from continuing to effect a great change in vehicle behavior through use of the yaw moment booster switch.

Step SA4 next determines whether the prohibit control mode has been entered. If it has, the switch brake force is set to 0 (zero). In other words, if the prohibit control mode has been set, the yaw moment booster switches are disabled.

In this basic control mode A, the prohibit control mode can be set in three cases: (1) when counter steering is detected, (2) when the steering angle is great and exceeds a particular angle, which is 180 degrees in this exemplary embodiment, and (3) during high speed driving, which is defined as driving at 130 km/h or faster in this exemplary embodiment.

A drop in steering stability as a result of misoperation can be prevented by prohibiting yawing moment control during counter steering (1). Counter steering refers to a state in which the cornering direction detected by the yaw rate sensor 40 is different from the steering direction detected by the steering angle detector 50, that is, the driver is steering in the direction counter to vehicle spin.

It should be noted that the yaw moment booster switch on the same side as the direction in which the steering wheel is turned is normally applied to boost cornering performance. That is, yaw moment booster switch Y1 is operated when turning left. However, if counter steering is detected and the driver applies the yaw moment booster switch applied during normal yaw moment control, the brakes will be mistakenly applied to the outside wheel of the direction in which the vehicle is yawing, thus increasing the tendency of the vehicle to spin. This can be prevented by prohibiting yawing moment control when counter steering is detected, and a drop in steering stability can therefore be. prevented.

By prohibiting yawing moment control when the steering angle is great, exceeding 180 degrees in this exemplary embodiment (2), vehicle steerability can be sufficiently assured when the change in vehicle attitude is great because yaw moment control is disabled. Destabilizing vehicle behavior can also be prevented because yaw moment control is prohibited near the limits of the tires.

Furthermore, by prohibiting yaw moment control when travelling at high speed, 130 km/hr or greater in this exemplary embodiment, the vehicle can be assured of maintaining straight driving stability at high speed without interference from yaw moment control. Vehicle safety during high speed operation can therefore be assured.

The calculated brake force to be developed is then calculated in step SA5 by adding the switch brake force detected from yaw moment booster switches Y2 and Y1 to the pedal brake force detected from brake pedal P2.

By thus calculating the calculated brake force to be developed, it is possible to use yaw moment control even when the brake pedal P2 is applied while cornering. Cornering performance can thus be yet further enhanced.

The calculated brake force is then applied to the control wheel in step SA6. The control wheel is the rear wheel on the same side as the yaw moment booster switch operated by the driver, and is typically the rear inside wheel of the yawing (corning) direction. For example, if when turning to the left the left yaw moment booster switch Y1 is operated, the calculated brake force is applied to the left rear wheel 20b.

This calculated brake force is developed by the brake fluid unit BU appropriately applying brake fluid pressure to the brake unit of the control wheel.

The number of driving scenarios in which yaw moment control is prohibited or assisted is kept as small as possible in basic control mode A (manual control) so that the yaw moment desired by the driver can be developed as requested by the driver in the greatest possible number of scenarios.

Figure 7:
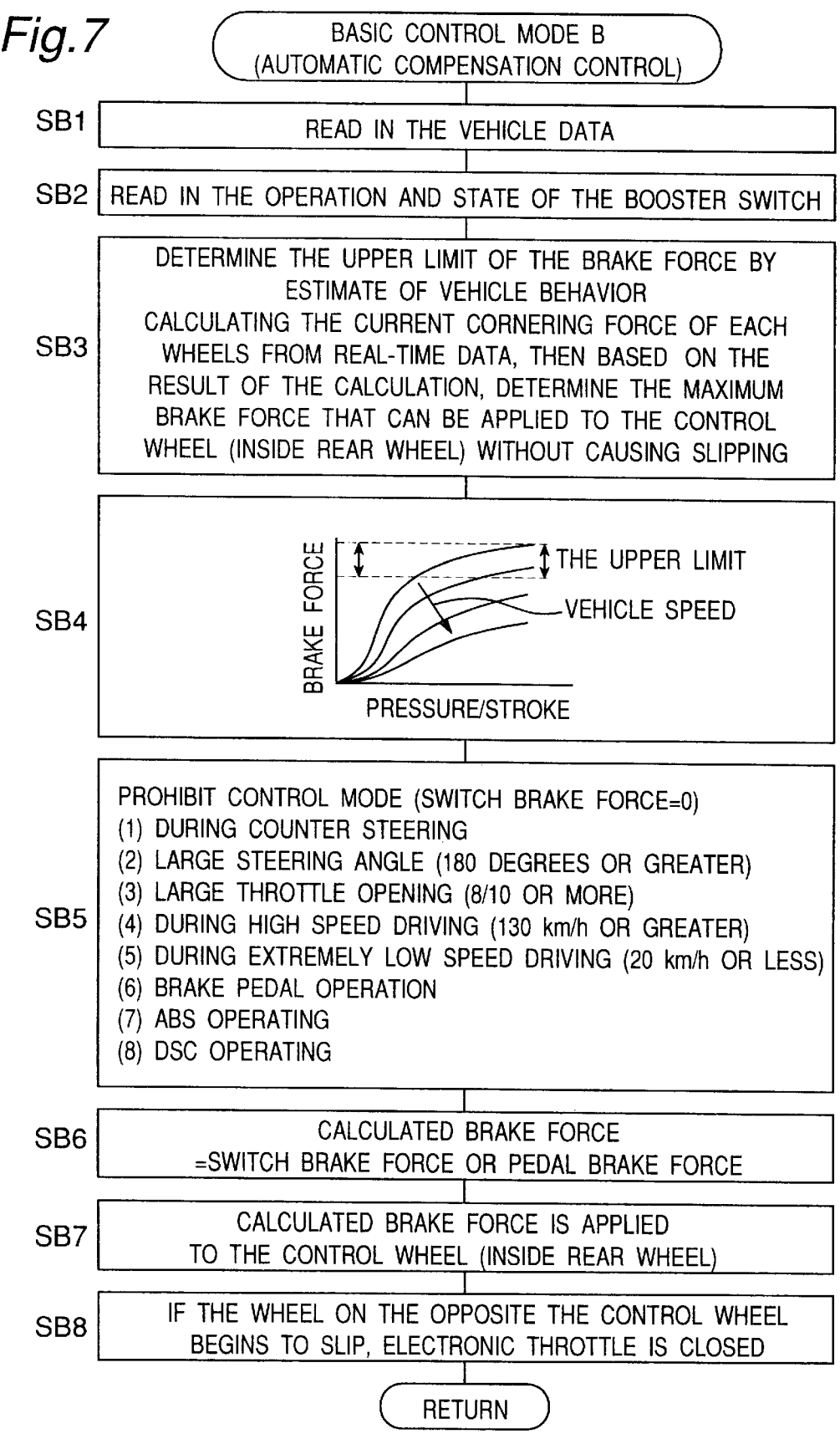
FIG. 7 is a flow chart of basic control mode B for automatic compensation control in the main flow chart shown in FIG. 5.

Referring to the flow chart in FIG. 7, basic control mode B (automatic yawing moment compensation control) is described next below.

At the first step SB1, vehicle data is read from the signals input to the central processing unit (YMBCPU 60) shown in FIG. 4 in the same way as in mode A shown in FIG. 6.

Next, at step SB2, the operation (stroke length 25 or pressure) and state (which switch was operated and how quickly) of the yaw moment booster switch Y2, Y1 operated by the driver is then read.

Furthermore, at step SB3 a real-time estimate of current vehicle behavior is then obtained and the current cornering force of each wheel is calculated from this vehicle data. Then, based on the result of this calculation, the maximum brake force (the upper limit of the switch brake force) that can be applied to the control wheel without causing slipping is determined.

Using the yaw moment booster switch operation data detected in SB2, the switch brake force.is determined by referencing the brake force characteristic curve shown in SB4.

Using the brake force control curve shown in SB4, the maximum brake force is variably determined in real time based on the value calculated in SB3. At low vehicle speeds the brake force and switch pressure/stroke curve rises sharply when the switch pressure/stroke is low, as in step SA3 above, and rises gradually when the switch pressure/stroke is high so that as vehicle speed increases, the slope of the control curve gradually decreases.

By thus defining the yaw moment control curve so that the maximum brake force changes dynamically in real time, the maximum brake force that can be applied to the control wheel is always below the level that will cause the wheels to slip even if the driver operates the yaw moment booster switches Y2 and Y1 to apply a high brake pressure. The control wheel can therefore be prevented from slipping. Vehicle behavior thus not become unstable, and consistently stable vehicle behavior can be maintained.

Furthermore, by setting the slope of the brake force to switch stroke/pressure curve so that it gradually declines as vehicle speed increases, there is less change in brake pressure during high speed driving, and vehicle steerability and safety can be improved.

Step SB5 next determines whether the prohibit control mode has been entered. If it has, the switch brake force is set to 0 (zero) as in step SA4 above.

In this basic control mode B, the prohibit control mode can be set in the following cases: (1) when counter steering is detected, (2) when the steering angle is great and exceeds a particular angle, which is 180 degrees in this exemplary embodiment, (3) when the throttle opening is great, which is defined as 8/10 or more of the full throttle opening in this exemplary embodiment, (4) during high speed driving, which is defined as driving at 130 km/h or faster in this exemplary embodiment, (5) when driving at extremely low speed, which is defined as 20 km/hr or less in this exemplary embodiment, (6) when the brake pedal is applied, (7) when the ABS is operating, and (8) when the DSC is operating.

As in basic operating mode A above, deterioration in vehicle behavior as a result of misoperation by the driver can be prevented by prohibiting yaw moment control during counter steering (1). Steering stability can thus be assured. In addition, by prohibiting yaw moment control when the steering angle is great, exceeding 180 degrees in this exemplary embodiment (2), vehicle steerability can be assured and destabilization of vehicle behavior can be prevented as in control mode A above.

Because engine output increases with the throttle opening, applying yaw moment control when the throttle opening is great results in significant engine power being transferred to the rear wheel that is not braked by yaw moment control. This makes the vehicle tend to spin. Therefore, by prohibiting yaw moment control when the throttle opening is 8/10 or more of the full throttle opening (3), this tendency to spin can be prevented and driving safety can be improved. straight driving stability at high speed can be assured and vehicle safety can also be improved by prohibiting yaw moment control when travelling at high speed (4), that is, at 130 km/hr or greater, as in control mode A above.

Furthermore, by prohibiting yaw moment control when driving at extremely low speeds, that is, 20 km/hr or less (5), the driving condition cannot be shifted to effect such dangerous driving conditions as spin turns, and safety when driving on public roads can be improved.

By prohibiting yaw moment control when the brake pedal is applied (6), differential brake force on the right and left wheels can be eliminated when the brakes are normally applied. Brake force can thus be applied evenly to the right and left wheels when the brake pedal is operated, and braking stability as expected during normal braking conditions can be reliably assured.

Furthermore, by prohibiting yaw moment control when the ABS is operating (7), priority is given to ABS control and driving safety normally achieved with ABS control can be reliably assured.

Furthermore, by likewise prohibiting yaw moment control when the DSC system is operating (8), priority is given to DSC control and driving safety normally achieved with DSC control can be reliably assured.

The calculated brake force to be developed is then calculated in step SB6. If the driver has not operated the brake pedal, the switch brake force determined by yaw moment booster switch operation is used as the calculated brake force for yaw moment control. However, if the driver has operated the brake pedal, the pedal brake force is used as the calculated brake force, and brake force is developed as normally controlled with the brake pedal. By thus developing only the brake force determined by the brake pedal when the driver depresses the brake pedal, differential brake pressure is not developed in the right and left wheels, and stable braking as expected can be sufficiently assured.

The calculated brake force is then applied to the control wheel in step SB7. The control wheel is the rear wheel on the same side as the yaw moment booster switch operated by the driver, and is typically the rear inside wheel of the yawing (corning) direction.

If great drive power is then transferred to the rear wheel on the side opposite the control wheel, that is, the rear outside wheel of the yawing (corning) direction, and the wheel begins to slip greatly, the electronic throttle is closed. By thus restricting engine output, any slipping that may occur in the rear outside wheel and the resulting instability in vehicle behavior can be immediately cancelled and the vehicle stabilized. As a result, driving stability can be improved and safety enhanced.

Basic control mode B (automatic compensation control) thus does not allow the driver to control the desired yawing moment, but rather emphasizes safety and prohibits yawing moment control or lowers control sensitivity in potentially dangerous situations so that the scenarios in which yaw moment control can be used are adjusted appropriately according to the situation and conditions.

Figure 8:
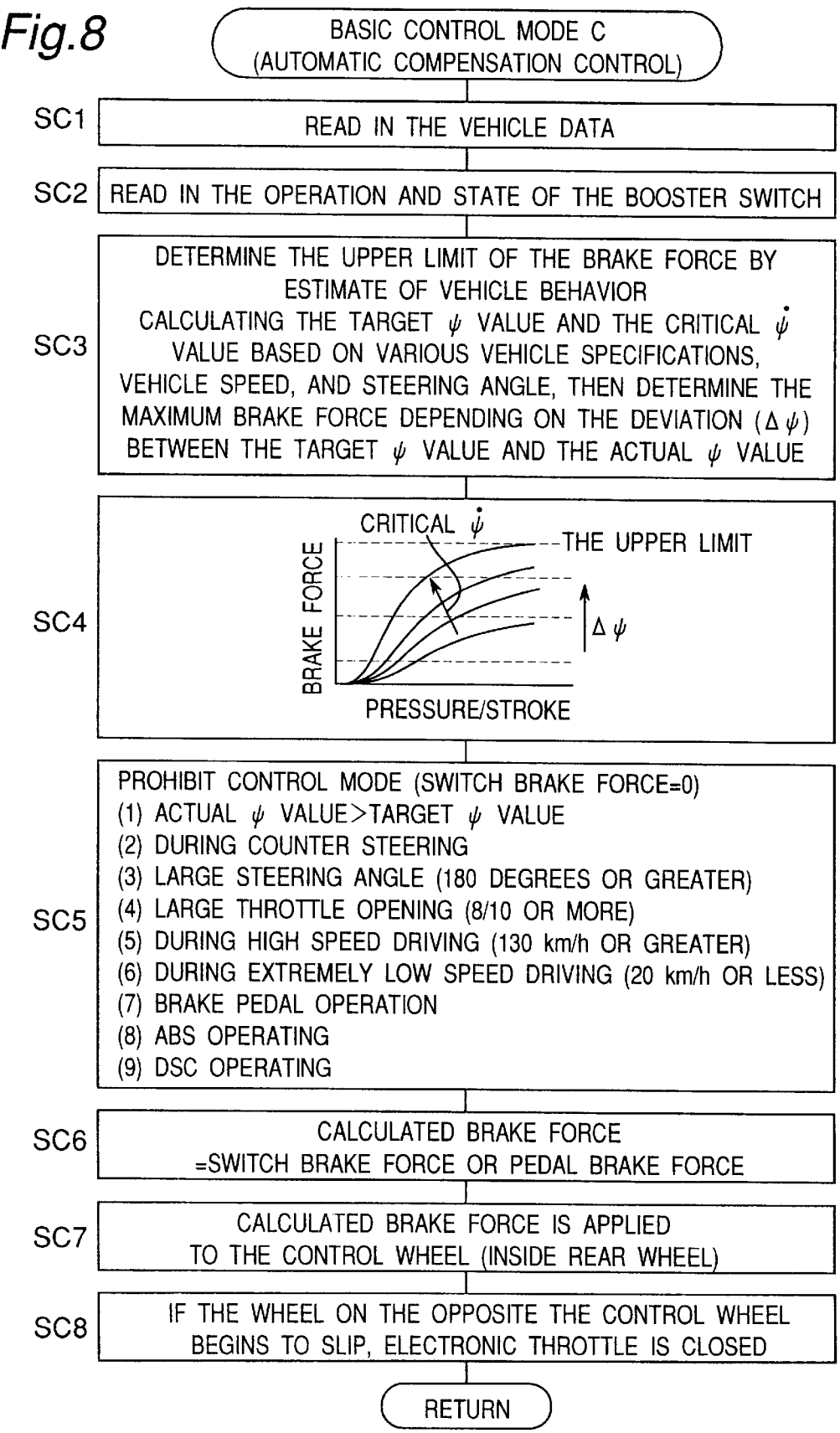
FIG. 8 is a flow chart of basic control mode C for automatic compensation control as an alternative to the above control mode B in the main flow chart shown in FIG. 5.

An alternative control mode C (automatic compensation control) used in place of the above-noted control mode B is described next below with reference to the flow chart in FIG. 8.

Mode B described above determines the maximum brake force with reference to wheel slipping conditions. This alternative mode C, however, determines the maximum brake force based on the vehicle yaw rate, and uses this value for brake control.

The first two steps, SC1 and SC2, of control mode C are identical to steps SB1 and SB2 of mode B above, and further description is therefore omitted below.

In step SC3 the vehicle status is inferred from the previously read vehicle data, and the upper limit for the usable brake force is determined. This upper limit is determined by calculating the target yaw rate in real time based on, for example, various vehicle specifications, the vehicle speed, and steering angle. The deviation $\Delta\psi$ between this target yaw rate and the actual yaw rate is then calculated to determine the maximum brake force that can be applied. This maximum brake force is thus the upper limit of the brake force that can be developed in the brakes.

The critical yaw angle acceleration is also calculated in real time.

The switch brake force is determined next from the brake force characteristic curve in SC4. The upper limit of this brake force curve varies according to the deviation $\Delta\psi$ obtained in SC3. If deviation $\Delta\psi$ is high, the upper limit rises; if deviation $\Delta\psi$ is low, the upper limit drops.

The slope of the brake force curve also increases as the critical yaw angle acceleration increases.

By thus setting the upper limit of the brake force to vary in real time according to the deviation $\Delta\psi$ between the target yaw rate and the actual yaw rate, a strong brake force can be developed in understeer conditions, that is, when deviation $\Delta\psi$ is high. As a result, a high yawing moment can be achieved as requested by the driver, and cornering performance can be improved. By lowering the upper limit when deviation $\Delta\psi$ is low and cornering is desirably near the target yaw rate, the vehicle cornering state is maintained and vehicle cornering stability can be improved.

Furthermore, by setting the slope of the control curve to vary according to the critical yaw angle acceleration, the critical yaw angle acceleration will not be exceeded no matter how suddenly the yaw moment booster switch is operated. Vehicle yaw will therefore not change suddenly, and vehicle behavior will not suddenly become unstable.

It will also be obvious to one with ordinary skill in the related art that the critical yaw angle acceleration can be a constant value. In this case the critical yaw angle acceleration is first considered before determining the slope of the control curve corresponding to switch operation, and the effect is the same.

Step SC5 next determines whether the prohibit control mode has been entered. If it has, the switch brake force is set to 0 (zero).

In basic control mode C, the prohibit control mode can be set in the following cases: (1) when the actual yaw rate is greater than the target yaw rate, (2) when counter steering is detected, (3) when the steering angle is great and exceeds a particular angle, which is 180 degrees in this exemplary embodiment, (4) when the throttle opening is great, which is defined as 8/10 or more of the full throttle opening in this exemplary embodiment, (5) during high speed driving, which is defined as driving at 130 km/h or faster in this exemplary embodiment, (6) when driving at extremely low speed, which is defined as 20 km/hr or less in this exemplary embodiment, (7) when the brake pedal is applied, (8) when the ABS is operating, and (9) when the DSC is operating. Note that conditions (2) through (9) in control mode C are identical to conditions (1) through (8) in control mode B, and further description thereof is thus omitted below.

By prohibiting yaw moment control when the actual yaw rate is greater than the target yaw rate (1) in control mode C, driving stability can be further improved by preventing a greater yaw moment from being imparted to a vehicle that is already cornering with a slight oversteer, and thus preventing the vehicle from being pushed into a spin as a result of a high yaw moment being imparted.

Steps SC6 to SC8 are identical to steps SB6 to SB8 of mode B above, and further description is therefore omitted below.

Yawing moment control in this mode C determines the overall vehicle behavior and thus achieves even safer yaw moment control compared with brake force correction based on wheel slipping in control mode B because the brake force applied to the control wheel is automatically corrected according to the vehicle yaw rate in this mode C.

It will be obvious that the yaw moment control system according the preferred embodiments of the invention described above consider only the right and left rear wheels as brake force control wheels, and that brake force can also be differentially applied to the right and left front wheels as a means of more easily generating a desired yawing moment.

In this case, however, the appropriate yaw moment is preferably developed by automatically correcting brake force distribution to the front and rear wheels according to such vehicle parameters as vehicle speed, steering angle, yaw rate, lateral acceleration, wheel slippage, and throttle opening.

(3) Various Driving Scenarios Using the Yaw Controller

The behavior of an automobile when driving under the control of our yaw controller and the control modes described above will be explained described next below with reference to the driving scenarios shown in FIG. 9 to FIG. 13. Note that in each of these figures MV indicates the vehicle in which the yaw controller is deployed, RV is a rival vehicle, and IV is a breakdown.

Figure 9:
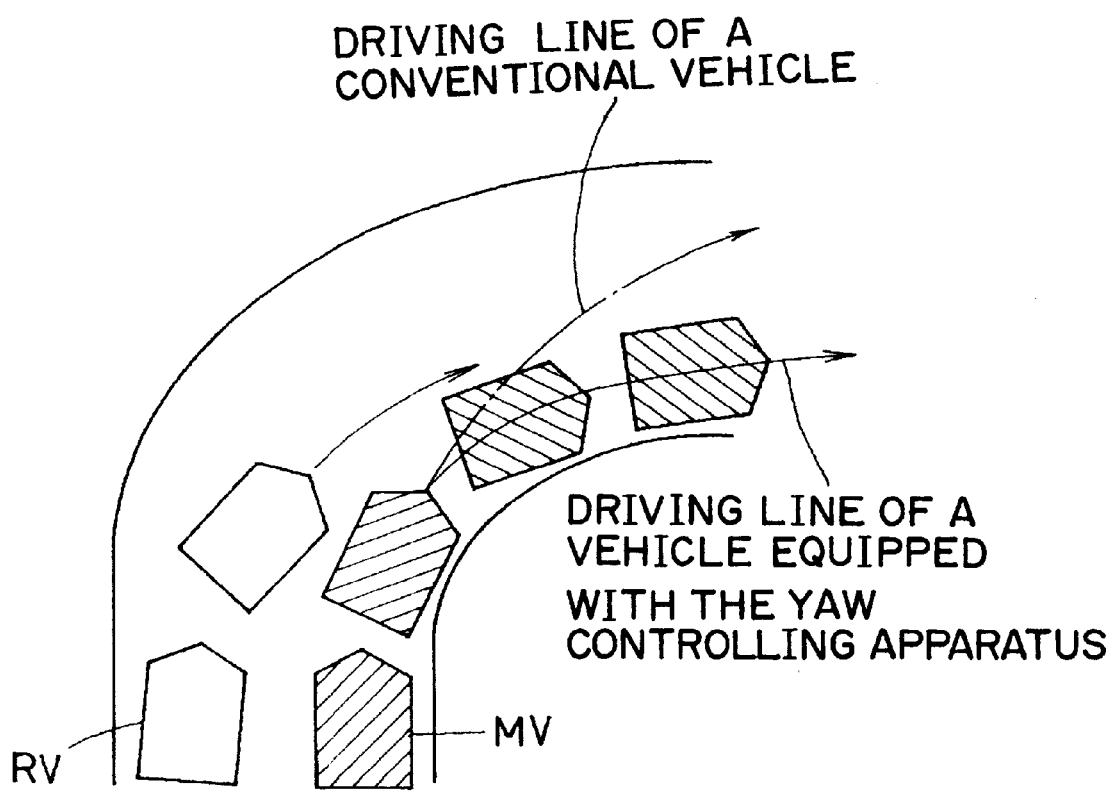
FIG. 9 is a vehicle behavior diagram of a driving scenario in which yawing moment control with the present invention is used to pass a car on a corner.

FIG. 9 shows vehicle behavior in a typical driving scenario using this yaw controller.

In this scenario vehicle MV passes rival vehicle RV on a race track by using the yaw controller system.

As shown in FIG. 9, vehicle MV is on the inside lane side of rival vehicle RV when entering the corner. If the driver applies the brakes slightly later than the rival vehicle RV driver, vehicle MV comes even with rival vehicle RV. However, a conventional vehicle in which the yaw controller is not deployed will overshoot the inside lane because the cornering force limit of the front wheels is exceeded, and the vehicle thus drifts to the outside lane. As a result, a conventional vehicle will then be passed again by the rival vehicle RV moving to the inside lane.

By operating the yaw moment booster switch on a vehicle equipped with the yaw controller at the corner clipping point, however, brake pressure is developed at the inside rear wheel, differential brake pressure is developed in the right and left rear wheels, and a desired yaw moment is developed at the rear wheels. A vehicle MV equipped with our yaw controller can thus continue around the corner on the inside lane, does not drift into the outside lane, and can thus avoid being passed again by rival vehicle RV.

By thus achieving better cornering performance than rival vehicle RV, vehicle MV can pass rival vehicle RV and be more successful on a race track.

Figure 10:
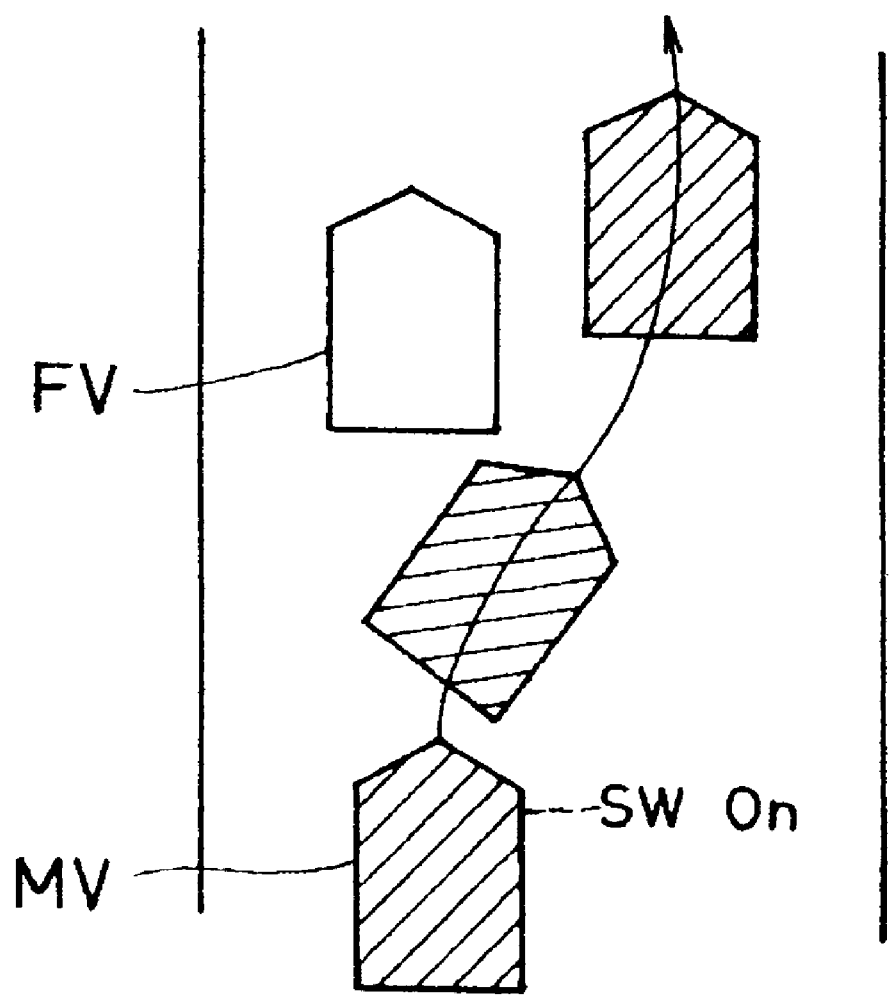
FIG. 10 is a vehicle behavior diagram for changing lanes using the yaw controller of the present invention.

FIG. 10 shows vehicle behavior when the yaw controller is used when changing lanes.

In this scenario there is a breakdown FV in front when driving at high speed. A sufficient yaw rate may not be achieved by steering only with the front wheels, and danger may not be avoided. However, by operating the yaw moment booster switch in this scenario brake force is developed in one of the rear wheels, and a desirable yaw moment can be actively developed between the right and left rear wheels. A sudden lane change can then be safely and easily negotiated. The yaw controller thus makes it possible to easily avoid hazards when travelling at high speed, and improves safety.

The yaw controller can also be used to develop a desirable yaw moment at the rear wheels and make normal lane changes with less movement of the steering wheel. As a result, high speed lane changes can also be negotiated with less right and left movement of the steering wheel, and more stable high speed driving can be achieved in normal highway driving.

It is to be noted that "SW On" shown in FIGS. 10–13 indicates the operating point of one of the right and left yaw moment booster switches. In these FIGS. 10–13, the right yaw moment booster switch is to be operated.

Figure 11:
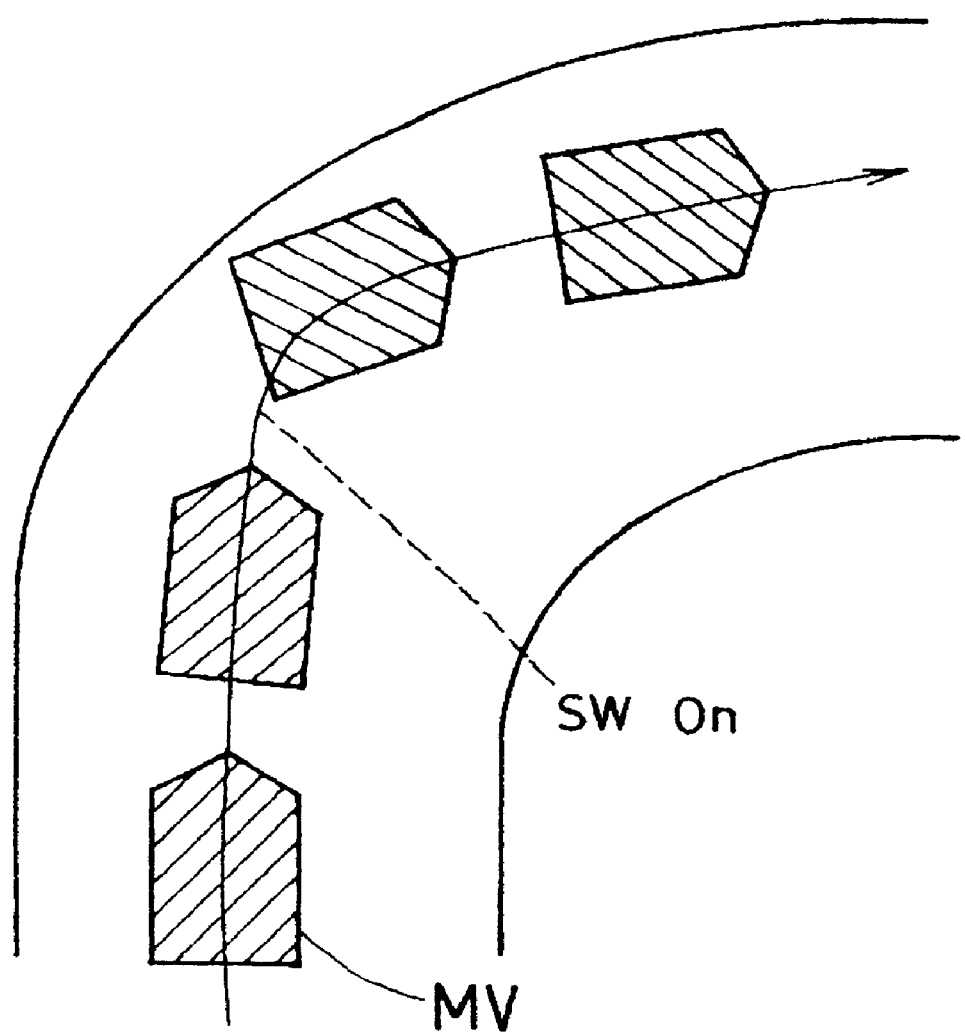
FIG. 11 is a vehicle behavior diagram of a driving scenario in which the yaw controller of the present invention is used to correct an understeer condition to a neutral steer condition.

FIG. 11 shows vehicle behavior in a driving scenario in which the yaw controller is used to recover a vehicle cornering with understeer to a neutral steer condition.

In this scenario the vehicle has entered the corner at high speed with vehicle inertia exceeding the front wheel cornering force. The vehicle thus moves greatly outside the steering angle in a typical understeer condition. By applying the yaw moment booster switch in this case brake pressure can be applied to the inside rear wheel and a desirable yaw moment can be developed at the rear wheels. As a result, an understeered vehicle can be returned to a neutral steer cornering condition.

Figure 12:
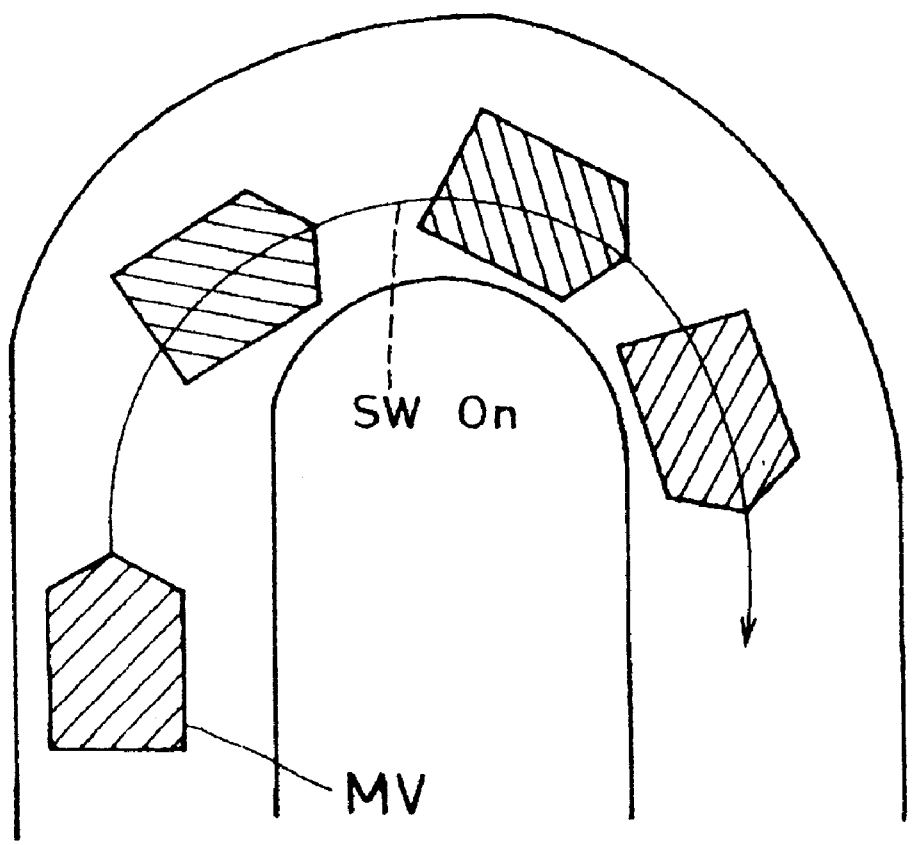
FIG. 12 is a vehicle behavior diagram for negotiating a tight corner using the yaw controller of the present invention.

FIG. 12 shows vehicle behavior in a driving scenario in which the yaw controller is used to improve cornering performance on a tight corner.

In this scenario, which might occur in a road rally or on a racing circuit, operating the yaw moment booster switch at the corner clipping point complements front wheel steering with brake force to the inside rear wheel, thereby increasing the yawing moment and enabling the tight corner to be turned. Tight corners can thus be turned quickly and nimbly without causing vehicle drift or other unstable conditions.

Figure 13:
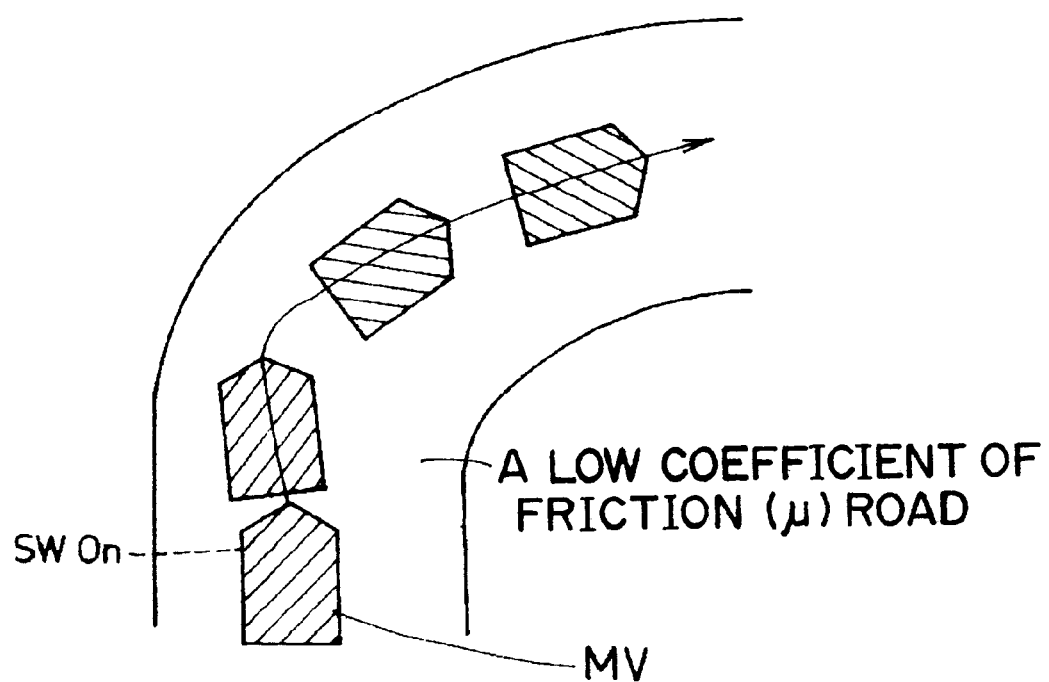
FIG. 13 is a vehicle behavior diagram for a special driving scenario in which a low coefficient of friction road surface is negotiated using the yaw controller of the present invention.

FIG. 13 shows vehicle behavior using the yaw controller in a special driving scenario, that is, to improve cornering performance on a low coefficient of friction ($\mu$) road surface.

Low adhesion between the tires and the road surface on a low $\mu$ surface tends to produce understeering when cornering. A special steering technique used to assure a high cornering force under these conditions on the racing circuit, road rallies, and even in areas with heavy snowfall uses a fainting motion in which the steering wheel is first turned in the opposite direction at the beginning of the corner and then quickly turned back to the desired cornering direction. This produces a high slip angle, increases the cornering force, and enables stable cornering.

This fainting motion, however, requires a certain skill and adeptness to complete because of the need to steer in opposite directions.

As shown in FIG. 13 the same effect as this fainting motion steering can be achieved without turning the steering wheel in the opposite direction by using our yaw controller to apply brake force to the wheel that will be the outside wheel of the turn at the beginning of the corner. This effectively shifts the vehicle weight to the inside wheel in the same way that the fainting motion steering does, and can thus assure a desirable fainting motion on a low coefficient of friction road surface.

The present invention has been described using some preferred embodiments thereof by way of example. It will be obvious that the invention is not limited to these embodiments, and shall include all variations having a yaw moment booster switch disposed where the switch is easily operable when the driver holds the steering wheel in both hands so that operation does not become complicated while actively applying brake force to the right and left wheels.

The present invention therefore includes such variations in which the yaw moment booster switch is provided on the back side of the steering wheel. When the yaw moment booster switch is thus provided on the back of the steering wheel, the yaw moment booster switch is unlikely to be operated unintentionally by simply handling the steering wheel, and vehicle behavior will not be degraded by such unintentional operation of the switch.

It will also be obvious that the present invention can otherwise be modified in various ways without departing from the scope of the following claims.

What is claimed is:

1. A vehicle yaw controlling apparatus that is a vehicle brake system capable of independently controlling right and left wheels, comprising:
    a pair of right and left operating switches each disposed wherein a driver can independently operate the right and left operating switches while holding a steering wheel with both hands;
    a control device for applying brake force to a brake unit of one of the right and left wheels when the driver operates one of the right and left operating switches, and applies brake force to a brake unit of the other of the right and left wheels when the driver operates the other of the right and left operating switches; and
    a control prohibiting means for prohibiting operation by the control device under a specific condition;
    wherein the control prohibiting means is a driver identification means for permitting use only by a particular driver.

2. A vehicle yaw controlling apparatus that is a vehicle brake system capable of independently controlling right and left wheels, comprising:
    a pair of right and left operating switches each disposed wherein a driver can independently operate the right and left operating switches while holding a steering wheel with both hands;
    a control device for applying brake force to a brake unit of one of the right and left wheels when the driver operates one of the right and left operating switches, and applies brake force to a brake unit of the other of the right and left wheels when the driver operates the other of the right and left operating switches; and
    a mode selecting unit enabling driver selection of at least one of a manual mode and an automatic mode;
    wherein the control device has a manual mode for developing brake force in the brake unit of each operating switch as directed by the driver when said mode selecting unit is set in said manual mode, and
    an automatic mode for developing brake force in each brake unit automatically corrected from the brake force indicated by driver operation of the respective operating switch when said mode selecting unit is set in said automatic mode.

3. A vehicle yaw controlling apparatus that is a vehicle brake system capable of independently controlling right and left wheels, comprising:
    a pair of right and left operating switches each disposed where a driver can independently operate the right and left operating switches while holding a steering wheel with both hands; and
    a control device for applying brake force to a brake unit of one of the right and left wheels when the driver operates one of the right and left operating switches, and applies brake force to a brake unit of the other of the right and left wheels when the driver operates the other of the right and left operating switches;
    wherein brake force developed in the brake unit of each operating switch is determined so that the initial operating sensitively of each operating switch is greater than switch sensitivity during a latter part of the operation.

4. A vehicle yaw controlling apparatus that is a vehicle brake system capable of independently controlling right and left wheels, comprising:
    a pair of right and left operating switches each disposed wherein a driver can independently operate the right and left operating switches while holding a steering wheel with both hands;
    a control device for applying brake force to a brake unit of one of the right and left wheels when the driver operates one of the right and left operating switches, and applies brake force to a brake unit of the other of the right and left wheels when the driver operates the other of the right and left operating switches; and
    a control prohibiting means for prohibiting operation by the control device under a specific condition
    wherein the control prohibiting means is a counter steering state control prohibiting means for prohibiting control when the vehicle yawing direction is detected to be opposite the steering direction.

5. A vehicle yaw controlling apparatus that is a vehicle brake system capable of independently controlling right and left wheels, comprising:
    a pair of right and left operating switches each disposed wherein a driver can independently operate the right and left operating switches while holding a steering wheel with both hands;
    a control device for applying brake force to a brake unit of one of the right and left wheels when the driver operates one of the right and left operating switches, and applies brake force to a brake unit of the other of the right and left wheels when the driver operates the other of the right and left operating switches; and
    a control prohibiting means for prohibiting operation by the control device under a specific condition;
    wherein the control prohibiting means is a large steering angle control means for prohibiting control when the steering angle exceeds a specific large angle.

6. A vehicle yaw controlling apparatus that is a vehicle brake system capable of independently controlling right and left wheels, comprising:
    a pair of right and left operating switches each disposed wherein a driver can independently operate the right and left operating switches while holding a steering wheel with both hands;
    a control device for applying brake force to a brake unit of one of the right and left wheels when the driver operates one of the right and left operating switches, and applies brake force to a brake unit of the other of the right and left wheels when the driver operates the other of the right and left operating switches; and
    a control prohibiting means for prohibiting operation by the control device under a specific condition
    wherein the control prohibiting means is a high output control prohibiting means for prohibiting control when engine output exceeds a specific high output level.

7. A vehicle yaw controlling apparatus that is a vehicle brake system capable of independently controlling right and left wheels, comprising:

a pair of right and left operating switches each disposed wherein a driver can independently operate the right and left operating switches while holding a steering wheel with both hands;

a control device for applying brake force to a brake unit of one of the right and left wheels when the driver operates one of the right and left operating switches, and applies brake force to a brake unit of the other of the right and left wheels when the driver operates the other of the right and left operating switches;

wherein brake force is developed only in the brake unit of the rear wheel on the side corresponding to the sperated operated switch.

8. A vehicle yaw controlling apparatus that is a vehicle brake system capable of independently controlling right and left wheels, comprising:

a pair of right and left operating switches each disposed wherein a driver can independently operate the right and left operating switches while holding a steering wheel with both hands;

a control device for applying brake force to a brake unit of one of the right and left wheels when the driver operates one of the right and left operating switches, and applies brake force to a brake unit of the other of the right and left wheels when the driver operates the other of the right and left operating switches; and a yaw rate brake force regulating means for regulating brake force developed in each brake unit so that the actual yaw rate developed in the vehicle by the control device does not exceed an appropriate yaw rate range.

9. A vehicle yaw controlling apparatus that is a vehicle brake system capable of independently controlling right and left wheels, comprising:

a pair of right and left operating switches each disposed wherein a driver can independently operate the right and left operating switches while holding a steering wheel with both hands;

a control device for applying brake force to a brake unit of one of the right and left wheels when the driver operates one of the right and left operating switches, and applies brake force to a brake unit of the other of the right and left wheels when the driver operates the other of the right and left operating switches; and a slipping brake force regulating means for regulating brake force developed in each brake unit so that the wheel slip rate is controlled to less than or equal to a specific slip rate.

10. A vehicle yaw controlling apparatus that is a vehicle brake system capable of independently controlling right and left wheels, comprising:

a pair of right and left operating switches each disposed wherein a driver can independently operate the right and left operating switches while holding a steering wheel with both hands;

a control device for applying brake force to a brake unit of one of the right and left wheels when the driver operates one of the right and left operating switches, and applies brake force to a brake unit of the other of the right and left wheels when the driver operates the other of the right and left operating switches;

at least one of a slip control device for suppressing wheel slipping and a dynamic stability control system for stabilizing vehicle behavior when cornering, and a prioritizing means for prioritizing control intervention when control by at least one of the slip control device and the dynamic stability control starts.

* * * * *